Nov. 1, 1932.                    H. T. STRONG                    1,885,642
                                THEATER FLOODLIGHT
                              Filed April 4, 1932        3 Sheets-Sheet 1

INVENTOR
Herbert T. Strong
BY
Cooper, Kerr + Dunham
ATTORNEYS

Nov. 1, 1932.   H. T. STRONG   1,885,642
THEATER FLOODLIGHT
Filed April 4, 1932   3 Sheets-Sheet 2

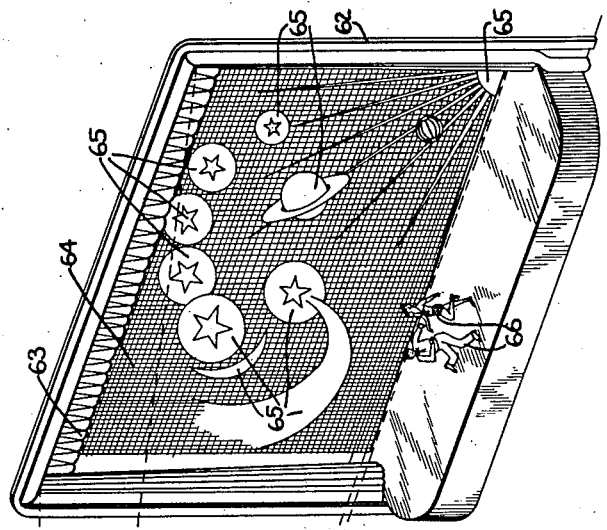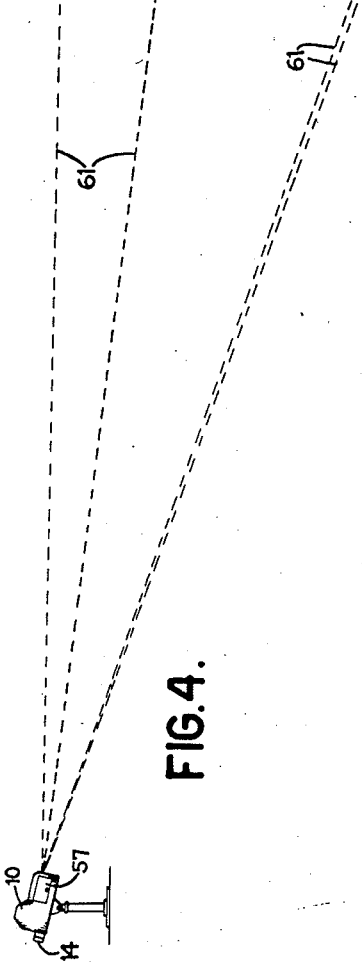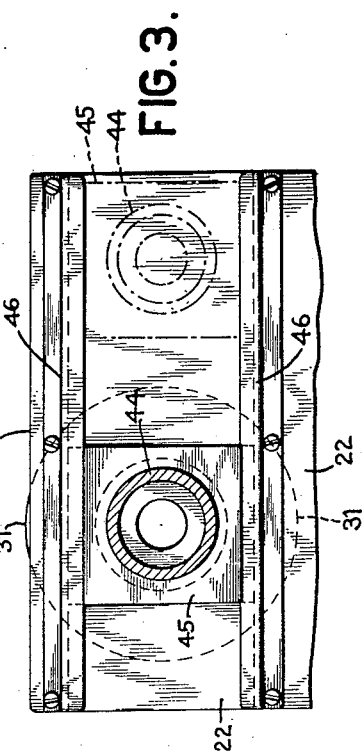

Patented Nov. 1, 1932

1,885,642

UNITED STATES PATENT OFFICE

HERBERT T. STRONG, OF CHATHAM, NEW JERSEY

THEATER FLOODLIGHT

Application filed April 4, 1932. Serial No. 603,072.

This invention relates to theater floodlights, and particularly to devices of that character adapted to illuminate theatrical drops, screens, curtains, figures, and the like in decorative manner, as with brilliant colors and colored designs.

In the art of stage setting and the arrangement of scenic and decorative representations on stages, considerable attention has been brought to the use of illuminating devices adapted to project colored light in various ways upon screens, back-drops, and other stage setting members. Various arrangements have been devised for throwing individual colors successively on part or all of settings of this nature and complex arrangements have been provided to illuminate portions of the same with one color and other portions with another. There have also been produced means for projecting groups of colors and for alternating the several colors in succession, whereby effects of fire, and simple natural phenomena have been represented.

Such prior devices, however, have been generally of two classes: Either (1) arrangements for projecting light through colored screens whereby blocks or masses of color with indistinct or blurred edges are thrown on the desired screen, or (2) arrangements in which colored lantern slides of a predetermined pattern, design or pictorial representation are employed in ordinary projection apparatus. In either case, the variety of pleasing effects and the scope of use of the apparatus have been limited in important respects; where colored screens are used, the representations are merely of large masses of color or of changing masses of color, so that the effects are of the simplest nature and lack extensive variety. On the other hand, if scenic or other artistic effects are sought to be produced with lantern slides or the like, changes of the effect are discouraged by the cost of such slides, which are in turn limited in attractiveness by the artistic skill and imagination of the maker; and if moving picture film is employed similar difficulties prevail, to an even greater extent.

Accordingly, the present invention seeks to provide an apparatus of the nature of a theater floodlight which may be used to illuminate a screen, back-drop, stage setting or the like, with an infinite number of startling and beautiful designs, of a character hitherto unavailable; it being also an object of the invention to provide such a machine which will at the same time impart a great number of brilliant colors to such designs, and thus produce an infinite variety of colored patterns or the like. It is a further object of the invention to provide a floodlight for use in theaters, moving picture houses, and similar purposes, adapted for novel illumination of large surfaces or comparatively large portions of surfaces with intricate and pleasing patterns in a wide variety of brilliant colors, and to produce such a device in which the coloring and the arrangement of individual patterns may be repeatedly and continuously varied.

It is a still further object of the invention to provide apparatus of the nature stated, for producing brilliantly colored patterns of many different characteristics, which may be manufactured at a relatively low cost; and to provide such an apparatus compact in form and simple to operate; as well as to provide such floodlight which may require no application of artistic skill as in the construction of slides, films, etc.

Yet another object of the invention is to provide apparatus for setting up artistic theatrical effects, whereby novel and amazing colored representations are produced for more effective display of scenic members, figures, costumes, actors, and so forth.

To these and other ends, hereinafter apparent or incidental to its nature, a desirable form of the invention comprises a floodlight apparatus, which may, if desired, be universally mounted and of a portable nature, and in which there is employed a source of light, means for polarizing such light, means of the nature of an analyzer, adapted to transmit only light of a certain polarization, a light-modifying element of the nature of a crystalline aggregate layer, means for disposing such element, as on a slide or the like, between polarizer and analyzer, and projecting means whereby light transmitted from the source through the several means named may be projected on the desired stage drop, screen, setting, or the like. An arrangement of this character, which makes use of the peculiar nature of polarized light and of the polarizing, double-refracting, and/or interference-creating effects on such light produced by crystalline substances of various sorts, provides a novel combination which is particularly useful in the art of stage and stage setting illumination, and capable of remarkable and startlingly unexpected results.

In such cases, for example, by providing in association with the so-called polarizing and analyzing means a thin film of the nature of a crystalline aggregate of any of a large number of substances, there may be thrown on the stage drop a bright and highly colored pattern or design, such design differing for each substance used and the particular designs differing, as may be desired, for different films of each substance. It is also found that by rotating the several members, individually or one or more of them together, startling variations of such pleasing designs, i. e., variations both in colors and pattern, may be effected; the result in most cases being not merely "kaleidoscopic", but in fact such as to defy description.

In many cases, the attractive nature of the projected patterns or designs, or the nature of the colors in such patterns or designs may be heightened or varied by the introduction of one or more other light-modifying elements, comprising polarizing, double-refracting, and/or interference-creating media, such as additional films of simple or aggregate crystalline nature; for example, it has been found that a thin film or plate of selenite, or of mica, such as a quarter-wave plate, designed for imparting a brilliant tint to polarized light by an interference effect (when other modifying media are absent), may be used to great advantage along with the pattern-producing film of crystal.

A desirable embodiment of the invention, including a convenient arrangement of apparatus for producing novel stage-illuminating effects, is illustrated in the drawings, in which:

Fig. 3 is a section on line 3—3 of Fig. 2;

Fig. 4 shows a part of a theater employing the stage illuminating apparatus of the invention.

Figure 1:
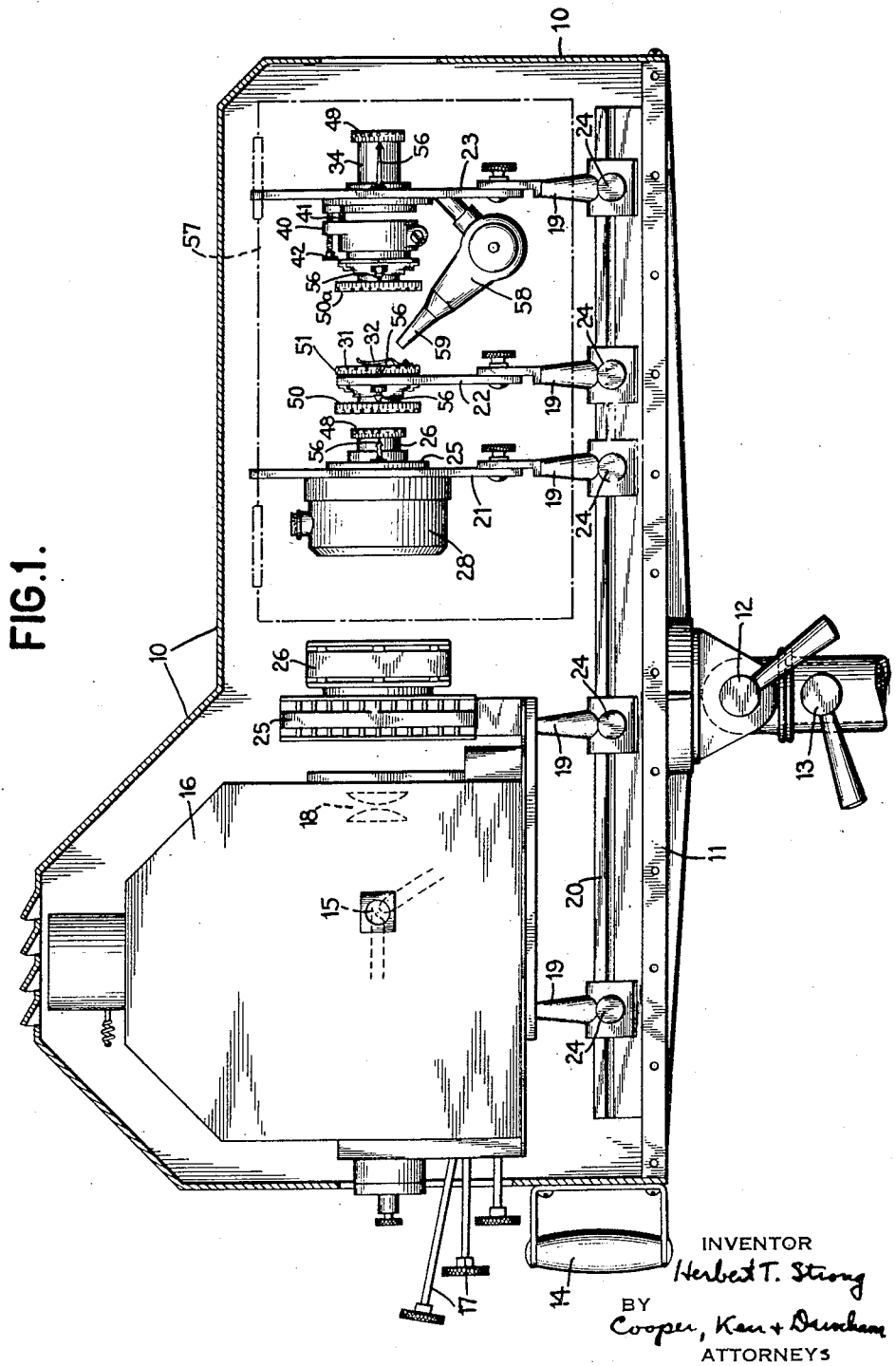
Figure 1 shows a side elevation of the floodlight, with the casing in section.

Referring to Fig. 1, the floodlight is shown to comprise a ventilated housing or casing 10, supported on a base 11, the latter being carried on the universal mounting pivots 12, 13, whereby the floodlight may be tilted or swung in any desired direction. For so moving the floodlight a handle 14 is provided.

Within the casing 10 there is mounted the source of light, the polarizing means, the second means for transmitting light having a given character of polarization—i. e., the so-called analyzing means,—the co-operating projecting means, and the media for producing the complex polarizing, refracting and/or interference-creating modification of light, or means for supporting such media. There are also provided means for adjusting and focussing the various members as desired or necessary.

The source of light may conveniently be the arc 15, supported in the housing 16, and having suitable feeding mechanism (not shown), of automatic character, controlling knobs 17 for the arc and mechanism being provided. Light-condensing means, such as the condensing lens arrangement diagrammatically shown at 18, or a suitable concave reflector placed behind the arc, may be associated with the arc in housing 16, the structure of arc, condenser, and housing being conveniently of standard type.

The housing 16 is conveniently carried by saddle members 19 mounted on a track 20 extending lengthwise of the base 11. The track 20 carries other saddle members, respectively supporting mounting plates 21, 22, 23, for other parts of the apparatus, each saddle member being secured to the track by a thumbscrew 24, releasable for longitudinal adjustment of the corresponding parts.

The projecting means, which includes the condenser and arc, may further include cooling devices, such as cooling cells 25, 26, provided with glass faces (not shown) through which light from condenser 18 may pass, and filled with water or other suitable fluid.

Figure 2:
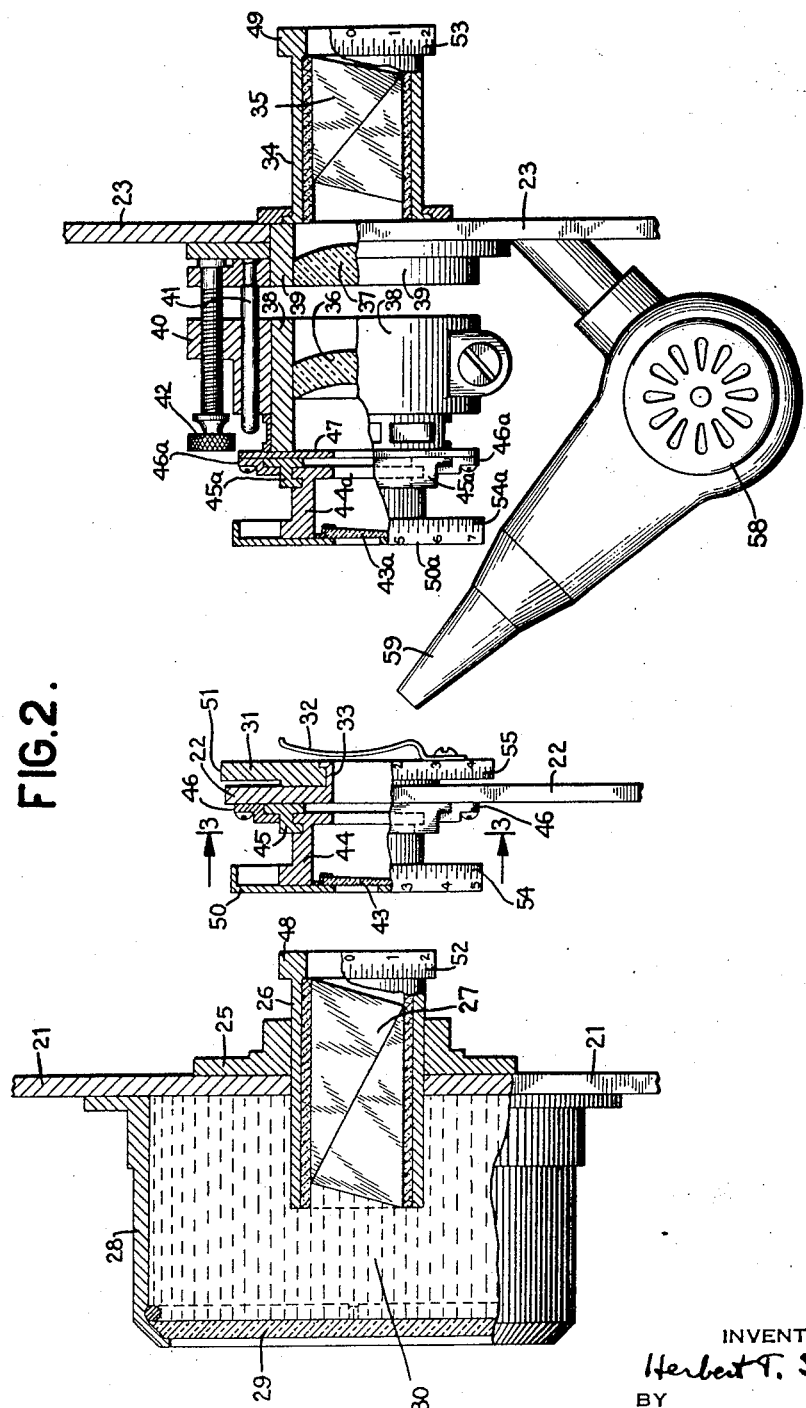
Fig. 2 is an enlarged side elevation of a portion of the apparatus shown in Fig. 1, partly cut away in vertical section.

Referring to Figs. 1 and 2, it is seen that the mounting plate 21 carries a collar member 25, and through the plate and collar member extends a cylinder 26, adapted to rotate about its central axis. Within this cylinder is suitably mounted (as in pitch or the like) a polarizing device or member 27; the mounting of member 27, and the fit of cylinder 26 in the cooperating parts being of a watertight character. The polarizing device here used is of the type known as a Nicol prism, comprising angularly cut crystals as shown; such a prism has been found highly desirable for floodlight apparatus of the character described, but other polarizing means may be employed in many cases. Associated with the polarizer is a cooling cell comprising an outer containing shell 28, secured to plate 21, and a cooperating glass face 29 sealed in the end of the cell nearest the arc. Such a cell, which is filled with water 30 or other suitable transparent fluid, or through which, if desired, such fluid may be circulated, has been found particularly advantageous for the floodlight, notably to protect the polarizer 27 and the other parts through which strong light passes, as hereinafter described.

Means for holding a crystalline film or other medium adapted to alter or otherwise affect the light transmitted through polarizer 27, as in the manner described, may comprise slide-holder 31 (see Figs. 1 and 2) having a central aperture and provided with spring clips 32 adapted to hold a glass plate, slide, or the like, carrying the crystalline film. Slide-holder 31 may be rotatably mounted on collar 33 carried by mounting plate 22, whereby the crystalline film or other medium may be rotated about an axis parallel to the path of light through the apparatus.

Referring further to the Fig. 2, it is noted that on mounting plate 23, there is rotatably disposed a cylinder 34 in which is secured, by a lining of pitch or by other suitable mounting means, a polarizing device or member 35, similar to polarizer 27, and comprising a similar Nicol prism. This device, being of a character adapted to transmit light polarized in a single plane, serves as the analyzing means hereinabove described; it being understood, however, that such so-called analyzing means may comprise, in many cases, other appropriate means for polarizing light or for transmitting light having polarization of a given character only.

The projecting means may further conveniently comprise a projecting lens or pair of associated lenses 36, 37 disposed respectively in suitable mounting shells 38, 39 carried on the side of the plate 23 opposite the analyzer 35. Such projecting lens means may advantageously be of an anastigmatic character and may desirably include correction for both spherical and chromatic aberration. Satisfactory results, for instance, have been had with a high grade lens arrangement of standard projector type, as shown; it being advantageous that all parts of the lens comprise glass as free from strain or other internal non-uniformity as possible. Freedom from strain, it may be noted, is also desirable in the condensing lenses. In order to provide for fine adjustment of the lens members 36, 37 relative to each other, a mounting ring 40, in which shell 38 is secured, rides on a pair of pins 41 (of which only one is shown) extending rearwardly from the mounting plate 23, to which latter shell 39 is made fast, and displacement of lens 36 may then be made by turning a thumbscrew 42 threaded in ring 40.

The light-modifying means, for altering or otherwise affecting the polarized rays employed in the floodlight whereby pleasing and highly colored stage illumination is produced, here also comprises one or more suitable films or sheets of selenite, mica, or the like, of the nature of a so-called "quarter-wave" plate. One of such selenite members, incorporated in the transparent member 43, is mounted in the suitable flanged ring 44, rotatably held in a selenite carriage member 45. As shown in Figs. 2 and 3, carriage 45 rides in slots provided by carriage guides 46, 46, secured to mounting plate 22, and thus may be slid transversely of the apparatus, so that selenite 43 may be moved into and out of registration with the rays of light passing through the apparatus. When the selenite is not in use, carriage 45 may then be disposed as in the dotted line position shown at the right of Fig. 3, or may be removed from the apparatus altogether. It being in some instances advantageous to employ more than one such selenite or mica plate, similar selenite-holding means may also conveniently be provided, disposed adjacent the projecting lens arrangement (see Fig. 2). Such means comprise guides 46a, 46a secured to a plate 47 mounted on shell 38, and cooperating carriage 45a and ring 44a, the latter holding selenite member 43a. The structure of these parts is the same as that described for selenite 43, but member 43a may conveniently differ from 43 in regard to the wavelengths of polarized light which it is adapted to pass; either or both of the selenites may be employed or slid out of place, as may be desired for a given illuminating effect. It is also noted that desirable illuminating operation is obtained with the selenites and the crystalline film (in holder 38) disposed intermediate the Nicol prisms, for example as shown.

As hereinabove described, polarizer 27, slide-holder 31, selenites 43 and 43a, and analyzer 35 are each adapted to be rotated about an axis parallel to the path of light rays. Means for so rotating the polarizer and analyzer include cylindrical flanges 48, 49, respectively, associated with cylinders 26 and 34, and adapted for manual rotation, as will be understood. For turning the selenites, similar extended rings or flanges 50, 50a are provided, respectively, secured to rings 44, 44a; each such flange, as in the case of flanges 48, 49, has a periphery adapted for ready manual rotation. In the case of the slide-holder 31, the rotating means includes the extension of the holder into a disk-like form, as shown, and the provision of cylindrical periphery 51 for similar manual operation.

It being desirable in many cases to be able to note, as for purposes of repetition of display or the like, the angular position of the several elements about the axis of the beam of light, peripheries of flanges 48, 49, 50, 50a and periphery 51 may each be provided with or inscribed with corresponding cylindrical scales 52, 53, 54, 54a and 55, graduated as desired. A suitable indicating finger or pointer 56 may be provided for each scale, as shown in Fig. 1. In this way, since the colored design or other illuminating effect projected on the screen or drop may vary in color or pattern with the rotation of any or all of the members described, an operator of the floodlight may be able to reset the machine readily for any desired figure or arrangement of colors, without manipulation or trial rotation in each case. In order to facilitate operation of the rotating members, the housing or casing 10 may be provided with a door 57 as illustrated (in Fig. 4, and in dotted lines in Fig. 1) through which the operator may also have access to slide-holder 31 for insertion and removal of plates or slides.

In order to protect the plates or slides against overheating, and for otherwise facilitating operation of the machine, cooling means for the slides is provided, here comprising a fan or blower generally designated 58, conveniently mounted on plate 23. This blower suitably operated by a small electric motor, not shown, is adapted to direct a stream of air through tube 59 against holder 31 and such slide or the like as may be disposed thereon.

In order to produce the desired illuminative effects on a stage drop, screen, or the like, any of a wide variety of media may be employed, for example in the form of thin films or layers disposed on plates or slides disposed on holder 31 in the path of rays from the polarizer 27. Other articles may in certain cases desirably be used as the light-modifying media—for example, relatively larger crystals, or groups of crystals, either artificially prepared, or derived from natural sources; or thin slices or films of agate, mica schist, etc. Particularly startling and beautiful effects, however, have been produced by the use of thin crystalline layers deposited on glass slides, conveniently in such way that the layer is composed of an aggregate of minute crystals or crystalline forms, either self-coherent, or disposed in appropriate binding material, which of itself may also serve a light-modifying purpose.

Among other ways of making up such crystal films, a desirable process consists in forming a saturated solution of the substance or substances sought to be deposited in a given case, and then drying, as by heat or simple evaporation, or otherwise suitably treating the solution, to effect the desired crystallization of the chosen material or materials out of the solvent or along with solidification of the solvent. In such cases it has been found convenient merely to mix up a small quantity of the desired substance or substances—often a mere pinch—with a few drops of the appropriate solvent, directly on the plate or slide. After being stirred and spread over a slide surface portion of desired area (in many cases at least equal to the entire area to be traversed by light rays in the apparatus), such mixture may then be covered with a thin flat cover glass and warmed or heated sufficiently to melt the entire mixture, as by dissolving the substance or substances in the solvent used. After removing the heat and permitting the plate to cool, there is found deposited under the protecting cover glass a very thin film of material, which in many cases may be entirely transparent and resemble merely a slight smudge or dull spot on the surface of the glass slide.

A slide so prepared is then inserted in the apparatus, and arc 15 turned on; after proper focussing, the stage drop or screen is found to be illuminated with a brilliant and intricate design, having a great number of pleasing colors. The method of focussing the several lenses and members, and the relative disposition of such parts will vary, as will be readily understood, with the construction of the flood light and the specific nature of the parts themselves. In the apparatus shown, for instance, the condensing lenses 18 may advantageously be so focussed that the beam of light converges toward projecting lenses 36, 37, and the latter focussed to throw a real image on the distant stage drop or the like, as will be readily understood.

As stated above, rotation of the polarizer or analyzer, or of the selenites or the crystalline film will effect gradual and distinctive changes in the nature of the pattern projected. In many instances, for example, rotation of the crystalline film produces the effect of rotating the entire image on the screen, and at the same time of successively and continuously altering the coloration of parts of the design; similar changes of design and color are usually produced by rotating either the polarizer or the analyzer, or both, and likewise by rotation of either selenite. The entire character of coloration of a given pattern or design may often be changed by turning a selenite through even a small angle; as the member is rotated, for instance, blue backgrounds may change to yellow, red to green, and the like, while portions of the pattern in contrasting colors may appear and disappear in surprising fashion.

Examples of certain of the parts suitable for use in a theater floodlight of the character described are as follows:

In the apparatus illustrated, the Nicol analyzer and polarizer may be of parallel-sided construction, the width of the faces i. e. the vertical dimension in Fig. 2, being of the order of 23 mm. In the same instance, lenses 36, 37 were of standard projector type, having a focal length of about 11.5 cm., although lenses having other focal lengths may be desirably employed. With apparatus of the dimensions stated, and using a 100-ampere D. C. arc having electrodes appropriately designed for immobility of the luminous area, desirable projection was obtainable over distances of the order of 175 feet or more, setting up an image capable of covering screens 40 feet square or larger with brilliant and highly colored designs and scenic effects. As will be understood, the light-condensing and projecting elements may vary according to requirements of use and in dependance, for example, on the nature and size of the theater, screen, and so forth.

Various reflecting surfaces may be employed for the screen, drop, or other member to be illuminated by the floodlight, standard motion picture screens being generally satisfactory. In some cases, drops or screens painted or sprayed with a suitable reflecting paint, such as a mixture of minute glass beads or particles suspended in a clear or uncolored lacquer, have been found advantageous.

By way of example, a few instances are given of the composition of crystalline films which have been employed in producing peculiarly attractive effects in a floodlight of the character described. In each case, a selenite plate or film was employed of a character adapted to otherwise modify the polarized light so as to tint the same with either of the complementary colors, blue and yellow, or to permit passage of white light, depending on the angular displacement of the selenite about the axis of the path of light, in respect to the polarizer and analyzer.

Example 1

Employing a crystalline film comprised of terpin hydrate crystallized from a solution of the same in xylol, a pattern is produced consisting of a number of fantastic and modernistic forms in a wide variety of colors,—reds, oranges, purples, greens, blues, and so forth.

Example 2

Using a crystalline film of sulpho-methane, crystallized from solution in Canada balsam, the projected design, again vigorously colored in light blues, browns, greens, and the like, bears the resemblance to a jumbled pattern of Chinese letters or characters.

Example 3

With a film of asparagin, crystallized from a water solution, the illuminated image resembles a fantastic representation of brightly colored polygonal figures, of a jewel-like nature.

Example 4

Employing curamin, which has been dissolved in alcohol and/or Canada balsam, effects may be produced as of weird foliage and aquatic vegetation, again in brilliant colors.

Example 5

With trional produced as a crystal film formed from solution in xylol, radiating streaks and other striking modernistic designs of variegated color are produced.

Example 6

Employing pilo carpin as the crystalline medium, deposited from solution in ethyl alcohol, the illumination resembles giant plumes of many-colored feathers of intricate and graceful appearance.

In some cases, striking illuminating effects are produced by permitting crystallization of the material on the slide to occur while the latter is in the floodlight, as by remelting the film with slight heat, just before insertion of the slide. Desirable results, showing a brigthly colored pattern growing inward from the edges of a screen, have for example been had by following such method with slides bearing a film of trional originally crystallized from solution in alcohol.

Not only may the floodlight be employed for illuminating a simple screen or drop, or other uniformly-reflecting surfaces, but it may comprise a portion of apparatus for creating other startling and novel scenic effects. For example, if a small screen or scenic member having a suitable reflecting surface is disposed in front of or adjacent to another or larger surface which is of substantially non-reflecting character for polarized light, the colored designs and patterns, when thrown on the small reflecting surface, stand out in startling and amazing manner against the black or otherwise dark background. With, for example, a small screen or reflecting surface of artistic outline or with a reflecting surface comprising costumes worn by one or more performers on the stage, and with a non-reflecting surface comprising, say, a drop or screen of heavy black velvet (which has now been found to show no appreciable illumination due to the colored designs thrown by the polarized light from the floodlight), novel and unusually attractive effects may be obtained. Using apparatus of such character, an entirely new range of scenic displays or representations is made possible for theatrical productions of many sorts, such as musical comedies, vaudeville performances, stage performances in moving picture houses, and the like.

Referring, for instance, to Fig. 6, there is shown the floodlight designated by its casing 10, disposed in a theater or other auditorium, and projecting a beam of light bounded by rays 61 toward the stage and proscenium opening 62. Back of the latter hangs a curtain or drop 63 comprising in part black velvet or other non-reflecting material 64 (represented by shading in the drawings) and having disposed on it, or as part of it, one or more portions of reflecting material 65, say of the beaded nature hereinabove described. These portions may have artistic shapes of one sort or the other, the pictured form serving merely by way of example. If the arrangement is to be used in a theatrical performance, for example, the performers may also be provided with costumes 66, made of material having like reflective properties—i. e. such as of cloth provided with a minutely beaded surface, or other reflective textile. It will now be seen that as the floodlight is operated to throw toward the stage the colored patterns or designs hereinabove described, such patterns or designs will be reproduced only on the reflecting surfaces whereby their effectiveness is vastly heightened; and at the same time the unusual nature of the effect is increased by the continual changes in form and color made possible in many instances by rotation of the various parts of the apparatus, as hereinabove described.

It will thus be seen that with a floodlight such as that of the character described, an entirely new range of illuminating and scenic effects is made possible for theaters, picture houses, and the like; it being also understood that the floodlight may be used or adapted for use in similar fields, as for large display advertisements on sign boards, in display windows, and the like.

It is to be understood that the invention is not limited to the apparatus herein specifically illustrated and described, but may be embodied in other forms without departure from its spirit as defined in the following claims:—

What I claim is:

1. A floodlight for theaters and the like, comprising projecting means, including a source of light, for brilliantly illuminating a stage drop or the like, and associated means disposed in the path of the projected rays for modifying the same to produce decorative illumination on the drop, said last-mentioned means comprising a polarizing device, an analyzing device, and a cooperating crystalline aggregate.

2. A floodlight for theaters and the like, comprising means for projecting brilliant illumination over a stage drop or the like, said means including a source of light; and associated means disposed in the path of rays from said source for modifying the rays to produce a decorative image on the drop, said modifying means including a device adapted to transmit light having polarization of a predetermined character, a second device adapted to transmit light having polarization of a predetermined character, and means of the nature of a crystalline layer adapted to alter in respectively different ways the nature of a plurality of portions of the light directed through the said devices.

3. A floodlight for theaters and the like, comprising means for projecting brilliant illumination over a stage drop or the like, said means including a source of light, light-condensing means, and a projecting lens; and means disposed in the path of light rays directed through said projecting means for modifying said rays to produce a decorative image on the drop, said modifying means including a polarizing device, an analyzing device, and a light-modifying device of the nature of a thin layer of aggregated crystals.

4. The floodlight of claim 3 in which the polarizing and analyzing devices are each mounted for rotation about an axis parallel to the path of light rays.

5. A floodlight for theaters and the like, comprising a supporting structure mounted for angular displacement in any desired direction; projecting means carried by said supporting structure and adapted for brilliant illumination of a stage drop, or the like, said projecting means including a source of light and associated lenses; and light-modifying means carried by said structure for producing, in cooperation with said projecting means, decorative illumination on the drop, said modifying means including a polarizing device, an analyzing device, and light-transmitting means of the nature of aggregated crystals disposed intermediate the polarizing and analyzing devices and adapted to alter in respectively different ways the nature of a plurality of portions of the projected light.

6. A floodlight for theaters and the like comprising means for projecting a brilliantly illuminated image over a stage drop or the like, said means including a source of light, a condensing lens and a projecting lens, and means associated with said projecting means for modifying the light rays directed therethrough to produce a multi-colored decorative image on the drop, said modifying means including a polarizing device, a light-transmitting film of crystalline aggregate nature, a uniform, interference-creating crystalline layer adapted to color polarized light, and a second polarizing device.

7. The floodlight of claim 6, in which the crystalline aggregate film, the uniform crystalline layer, and at least one of the polarizing devices are each provided with cooperating means for rotating same about an axis parallel to the path of light through the floodlight.

8. A floodlight for theaters and the like, comprising a source of light, means for projecting said light on a stage drop or the like, including a condensing device and a projecting lens, a polarizing prism, an analyzing prism, and supporting means for holding a light-modifying slide intermediate said polarizing and analyzing prisms, said prisms and projecting means being adapted to project brilliantly illuminated images on the drop.

9. In a floodlight for theaters and the like, the combination of projecting means, including a source of light, for brilliantly illuminating a stage drop or the like, light-modifying devices comprising a polarizer and an analyzer mounted in the path of light rays through the projecting means, and a slide-holder disposed intermediate the said members.

10. In a floodlight for theaters and the like, the combination of claim 9, including also one or more crystalline members disposed intermediate the light-modifying devices, each said crystalline member being adapted, in cooperation with the last-mentioned devices, to impart a uniform color to the projected illumination on the drop when other light-modifying media are absent.

11. In a floodlight for theaters and the like, the combination of claim 9, in which the slide-holder is mounted for rotation in the path of light rays and about an axis parallel to said path.

12. In a floodlight for theaters and the like, the combination of claim 9, in which the slide-holder is mounted for rotation in the path of light rays and about an axis parallel to said path, and in which at least one of the light-modifying devices is mounted for rotation about an axis parallel to the path of light rays.

13. In apparatus for producing stage illuminating effects, the combination of projecting means adapted to brilliantly illuminate a stage drop or the like, light-modifying means associated therewith for imparting a decorative character to such illumination, said light-modifying means comprising a polarizer, a crystalline aggregate layer, and an analyzer, a stage setting member having a surface adapted to brilliantly reflect the illumination from the said projecting and modifying means, and a second stage setting member having a surface adapted for substantial non-reflection of said illumination, whereby the decorative illumination of said first-mentioned member is enhanced by contrast with said second mentioned member.

14. The combination described in claim 13 in which the surface of the first-mentioned member comprises a layer of minute glass beads secured in a suitable vehicle, and in which the surface of the second-mentioned member comprises a black velvet-like material.

In testimony whereof I hereto affix my signature.

HERBERT T. STRONG.